US012565135B2

(12) United States Patent
Wolf

(10) Patent No.: US 12,565,135 B2
(45) Date of Patent: Mar. 3, 2026

(54) RETRACTABLE DOUBLE WIDTH EXPANDING CAMPER SHELL

(71) Applicant: Rivian IP Holdings, LLC, Plymouth, MI (US)

(72) Inventor: Philipp J. Wolf, Dana Point, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 400 days.

(21) Appl. No.: 18/071,401

(22) Filed: Nov. 29, 2022

(65) Prior Publication Data

US 2024/0174162 A1 May 30, 2024

(51) Int. Cl.
| | |
|---|---|
| *E04H 15/06* | (2006.01) |
| *B60P 3/32* | (2006.01) |
| *B60P 3/34* | (2006.01) |
| *B60P 3/39* | (2006.01) |

(52) U.S. Cl.
CPC ................. *B60P 3/341* (2013.01); *B60P 3/32* (2013.01); *B60P 3/34* (2013.01); *B60P 3/39* (2013.01); *E04H 15/06* (2013.01)

(58) Field of Classification Search
CPC .... B60P 3/341; B60P 3/32; B60P 3/34; B60P 3/39; E04H 15/06
USPC ........ 135/88.13, 88.16, 88.17; 296/156, 159, 296/161, 169, 173
See application file for complete search history.

(56) References Cited

U.S. PATENT DOCUMENTS

| | | | | |
|---|---|---|---|---|
| 1,276,388 A | * | 8/1918 | Marx ...................... | B60P 3/341 296/161 |
| 1,477,111 A | * | 12/1923 | Eaton ...................... | B60P 3/341 296/174 |
| 1,527,105 A | * | 2/1925 | Zagelmeyer ............ | B60P 3/341 296/164 |
| 1,551,864 A | * | 9/1925 | Bothwell ................ | B60P 3/341 296/174 |
| 1,564,257 A | * | 12/1925 | Lippman ................. | B60P 3/341 296/169 |
| 1,578,390 A | * | 3/1926 | Brown .................... | B60P 3/341 296/169 |
| 1,864,047 A | * | 6/1932 | Lawhorne ................ | B60P 3/34 135/96 |
| 1,946,164 A | * | 2/1934 | Houdashelt ............. | B60P 3/341 52/64 |
| 2,003,816 A | * | 6/1935 | Allen ...................... | B60P 3/341 296/173 |
| 2,152,713 A | * | 4/1939 | Stewart .................... | B60P 3/34 52/63 |
| 2,632,667 A | * | 3/1953 | Gray ...................... | B60P 3/341 5/118 |

(Continued)

OTHER PUBLICATIONS

Conner Golden; "Rivian's + Yakima Roof Tent Hands-On Review: Cozy Camping"; MotorTrend; Oct. 20, 2021; retrieved from https://www.motortrend.com/features/rivian-r1t-rooftop-bed-tent-review/.

(Continued)

*Primary Examiner* — Robert Canfield
(74) *Attorney, Agent, or Firm* — Patterson + Sheridan, LLP

(57) ABSTRACT

Disclosed are embodiments for providing an apparatus including a platform configured to be supported by a side of a vehicle and one or more actuators configured to support a roof structure, wherein the roof structure is coupled with the platform to support the platform over the side of the vehicle.

18 Claims, 10 Drawing Sheets

(56) References Cited

U.S. PATENT DOCUMENTS

| | | | | | |
|---|---|---|---|---|---|
| 2,788,238 | A | * | 4/1957 | Baird | B60P 3/341 |
| | | | | | 296/164 |
| 2,832,637 | A | * | 4/1958 | Decosse | B60P 3/34 |
| | | | | | 296/26.15 |
| 3,013,836 | A | * | 12/1961 | Groh | B60P 3/341 |
| | | | | | D12/104 |
| 3,194,251 | A | * | 7/1965 | Pettersen | B60P 3/341 |
| | | | | | 52/63 |
| 3,394,961 | A | * | 7/1968 | Matte | B60P 3/34 |
| | | | | | 52/64 |
| 3,429,608 | A | * | 2/1969 | Farnum | B60P 3/34 |
| | | | | | 296/173 |
| 3,455,596 | A | * | 7/1969 | Krutzikowsky | B60P 3/341 |
| | | | | | 296/156 |
| 3,456,978 | A | * | 7/1969 | Daniels | B60P 3/341 |
| | | | | | 296/170 |
| 3,456,979 | A | * | 7/1969 | Hunter | B60P 3/341 |
| | | | | | 296/170 |
| 3,466,082 | A | * | 9/1969 | Branch | B60P 3/341 |
| | | | | | 135/88.13 |
| 3,475,047 | A | * | 10/1969 | Daniels | B60P 3/341 |
| | | | | | 296/170 |
| 3,488,085 | A | * | 1/1970 | Wallace | B60P 3/341 |
| | | | | | 296/168 |
| 3,558,181 | A | * | 1/1971 | Peterson | B60P 3/341 |
| | | | | | 296/26.02 |
| 3,583,755 | A | * | 6/1971 | Hedrick, Jr. | B60P 3/341 |
| | | | | | D12/104 |
| 3,652,122 | A | * | 3/1972 | Beauregard | B60P 3/341 |
| | | | | | 135/117 |
| 3,697,121 | A | * | 10/1972 | Park | B60P 3/341 |
| | | | | | 52/63 |
| 3,737,190 | A | * | 6/1973 | Smith | B60P 3/341 |
| | | | | | 135/132 |
| 3,858,744 | A | * | 1/1975 | Garvert | B60J 7/141 |
| | | | | | 220/826 |
| 3,884,520 | A | * | 5/1975 | Peterson | B60P 3/341 |
| | | | | | 296/26.02 |
| 4,027,911 | A | * | 6/1977 | Johnson | B60P 3/341 |
| | | | | | 296/161 |
| 4,113,301 | A | * | 9/1978 | Olmstead | B60P 3/341 |
| | | | | | 296/161 |
| 4,294,484 | A | * | 10/1981 | Robertson | B60P 3/34 |
| | | | | | 135/88.13 |
| 4,463,982 | A | * | 8/1984 | Irelan | B60P 3/34 |
| | | | | | 296/170 |
| 4,657,300 | A | * | 4/1987 | Penny | E04H 15/008 |
| | | | | | 296/173 |
| 4,918,772 | A | * | 4/1990 | Haile | B60P 3/38 |
| | | | | | 5/119 |
| 5,143,417 | A | * | 9/1992 | Philley | B60P 3/341 |
| | | | | | 5/118 |
| 5,462,330 | A | * | 10/1995 | Brown | B60P 3/34 |
| | | | | | 135/88.13 |
| 5,478,129 | A | * | 12/1995 | Goto | B60P 3/14 |
| | | | | | 135/88.13 |
| 5,544,671 | A | * | 8/1996 | Phillips | B60P 3/341 |
| | | | | | 135/88.14 |
| 6,217,106 | B1 | * | 4/2001 | Reckner, Jr. | B60P 3/341 |
| | | | | | 5/119 |
| 6,439,647 | B1 | * | 8/2002 | Baldwin | B60P 3/34 |
| | | | | | 296/165 |
| 6,604,777 | B2 | * | 8/2003 | Neville | B60P 3/341 |
| | | | | | 296/173 |
| 6,679,542 | B1 | * | 1/2004 | Semotuk | B60P 3/341 |
| | | | | | 296/173 |
| 6,712,422 | B1 | * | 3/2004 | Vaillancourt | B60P 3/341 |
| | | | | | 296/170 |
| 6,749,252 | B2 | * | 6/2004 | Cervenka | B60P 3/341 |
| | | | | | 296/165 |
| 6,783,169 | B1 | * | 8/2004 | Marx | B60J 7/141 |
| | | | | | 296/100.09 |
| 7,322,637 | B2 | * | 1/2008 | Smith | B60P 3/341 |
| | | | | | 296/159 |
| 7,527,318 | B2 | * | 5/2009 | Geise | B60P 3/39 |
| | | | | | 296/100.06 |
| 7,810,866 | B2 | * | 10/2010 | Dempsey | B62D 63/062 |
| | | | | | 296/173 |
| 8,857,892 | B1 | * | 10/2014 | Shockley | B60P 3/341 |
| | | | | | 296/174 |
| 11,554,709 | B2 | * | 1/2023 | McGregor | E04H 15/06 |
| 11,613,198 | B1 | * | 3/2023 | Carlseen | B60P 3/39 |
| | | | | | 296/165 |
| 2002/0140252 | A1 | * | 10/2002 | Neville | B60P 3/341 |
| | | | | | 296/164 |
| 2003/0146646 | A1 | * | 8/2003 | Cervenka | B60P 3/341 |
| | | | | | 296/165 |
| 2005/0076584 | A1 | * | 4/2005 | Loranger | E04H 15/06 |
| | | | | | 52/79.5 |
| 2006/0208462 | A1 | * | 9/2006 | Spence | B60P 3/341 |
| | | | | | 280/656 |
| 2006/0226677 | A1 | * | 10/2006 | Smith | B60P 3/341 |
| | | | | | 296/173 |
| 2008/0122197 | A1 | * | 5/2008 | Spence | B60P 3/39 |
| | | | | | 280/400 |
| 2008/0265617 | A1 | * | 10/2008 | Davidson | B60P 3/341 |
| | | | | | 296/173 |
| 2013/0154212 | A1 | * | 6/2013 | Vandergon | B62B 13/18 |
| | | | | | 280/491.1 |
| 2016/0076271 | A1 | * | 3/2016 | Reinking | B60H 1/00364 |
| | | | | | 135/91 |
| 2021/0293047 | A1 | * | 9/2021 | Frederickson | B60P 3/341 |
| 2022/0305978 | A1 | * | 9/2022 | Marqueton | B60P 3/34 |
| 2023/0054064 | A1 | * | 2/2023 | Lontz | B60P 3/34 |

OTHER PUBLICATIONS

Three-Person Tent Package; Rivian; retrieved on Jul. 7, 2022, from https://rivian.com/gear-shop/p/three-person-tent.

* cited by examiner

RETRACTABLE DOUBLE WIDTH EXPANDING CAMPER SHELL

BACKGROUND

Camper shells, truck rack tents, and roof top tents on vehicles may provide a safe and convenient space for drivers or passengers to rest when traveling. For example, a tent affixed to racks in a truck bed be used to as a shelter when camping. However, these solutions increase vehicle drag and reduce efficiency due to their frontal and/or profile areas extending beyond a body of the vehicle.

SUMMARY

Various aspects of the present disclosure described herein are generally directed to systems and methods for, among other things, a retractable camper shell and/or tent which can be integrated into a compartment of a vehicle such that there is minimal to no impact on the drag coefficient of the vehicle. For example, the retractable camper shell can be affixed to a track system in a truck bed of the vehicle such that, when collapsed, the retractable camper shell is flush with rails of the truck bed. Furthermore, an efficient way to create a large space while maintaining a compact storage profile is to use soft collapsible material (e.g., fabric) for a body of the retractable camper shell and/or tent, thereby reducing an amount of hard and/or rigid material that may be difficult to collapse into and maintain the compact storage profile. However, an expanded footprint and/or interior space can be increased through the use of rigid support structures such as side walls, roof, tent poles, entrance, beams, and/or a rigid body. For example, a roof structure and "L-shaped" sides can be spanned with a soft collapsible material that can be folded within rigid frame (e.g., the roof and the "L-shaped" sides) when collapsed within the compartment of the vehicles.

In addition, vertical risers, such as a linkage mechanism or linear actuators, are used, in various embodiments, to support the roof structure. For example, the "L-shaped" sides can be slid out away from the body of the vehicle (e.g., on a truck rack or other track system) and the vertical risers can be used to extend the roof structure up away from a base of the truck bed stretching the fabric material between the "L-shaped" sides and the roof structure creating an internal space. Furthermore, in some examples, the "L-shaped" sides include a corner hinge to enable the structure (e.g., the "L-shaped" sides) to fold flat while collapsed to reduce a footprint of the side of the retractable camper shell and/or tent. In addition, in such examples, the corner hinge enables a portion of the "L-shaped" sides to be extended out to provide increased space within the retractable camper shell and/or tent. Various additional features can be included, such as a solar panel integrated into the roof structure, electrical components such as interior lights, inflatable mattresses, heating, cooling, pop-up and/or extendable roof, windows, moon roof, and/or other accessories that can be integrated into the retractable camper shell and/or tent.

In one embodiment, an apparatus includes a platform configured to be supported by a side of a vehicle. The apparatus further includes one or more actuators configured to support a roof structure, wherein the roof structure is coupled to the platform to support the platform over the side of the vehicle.

In another embodiment, the apparatus includes a platform supported by a first side of a truck bed and a second platform configured to be supported by a second side of the truck bed, wherein the first side is on an opposite side from the second side of the truck bed, and wherein the roof structure is coupled with the second platform to support the second platform over the second side of the truck bed.

In yet another embodiment, a method includes causing a power source of the vehicle having a truck bed to provide power to one or more actuators configured to support a roof structure of an apparatus; wherein the roof structure is coupled with a platform to support the platform over a side of the vehicle; and causing the one or more actuators to extend the roof structure along an axis.

This summary is provided to introduce a selection of concepts in a simplified form that are further described below in the detailed description. This summary is neither intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the attached figures, wherein.

DETAILED DESCRIPTION OF THE INVENTION

Figure 1:
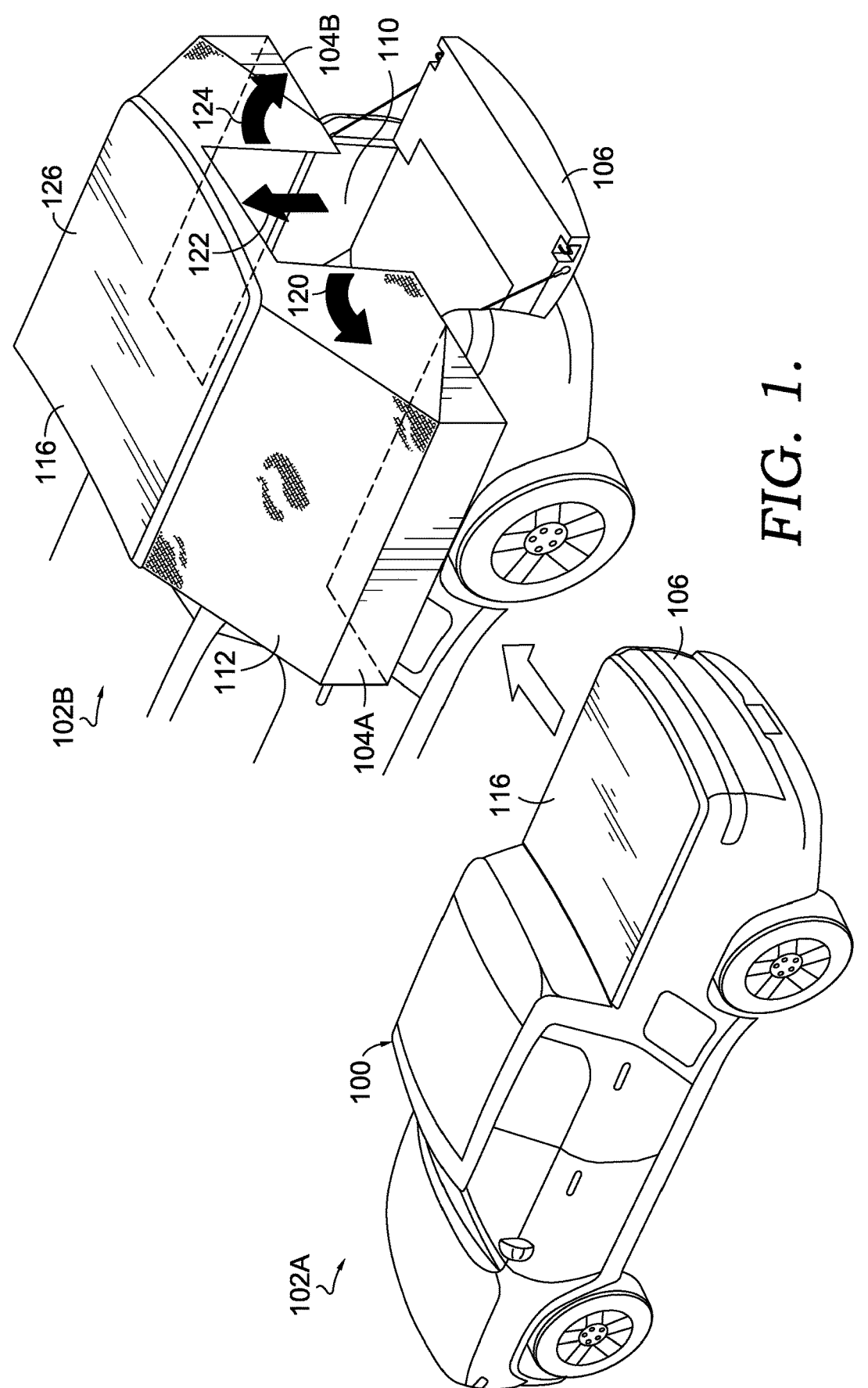
FIG. 1 is a block diagram of an exemplary schematic of a vehicle that includes a retractable camper shell, in accordance an embodiment of the present disclosure.

Vehicle drivers rely on vehicles not only to provide transportation, but also use vehicles for recreational purposes. Additionally, vehicles of various sizes include storage spaces that facilitate storage of various items during transportation. In particular, the storage spaces may provide a convenient area for storing and transporting objects without compromising the comfort of a driver or passenger. For example, a truck may include a storage space, such as a truck bed. Furthermore, these storage spaces may serve as dedicated regions for camper shell and/or tents that can be used during recreational activities. For example, a roof or a truck bed of a vehicle can be used as a base for a tent to allow drivers and/or passengers a place to sleep.

However, in the context of efficiency, camper shells and tents affixed to vehicles increase drag and thereby reduce efficiency of the vehicles. These camper shells and tents are often not designed with vehicle efficiency in mind and, as a result, can create drag resulting from the camper shells and/or the tents profile resulting in a reduction in the efficiency of the vehicle. In addition, with the proliferation of electric vehicles, including electric trucks, the need to create efficient vehicles that can travel greater distances while minimizing a draw on the batteries has increased. For example, a large camper shell can increase the drag coefficient of an electric truck and can reduce a range provided by the batteries. As a result, an effective range of the electric vehicle is reduced and the need to stop and charge the batteries is increased, which can have a negative impact on the driver and the passengers.

In addition, tents designed to be affixed to the vehicle and/or stored in the vehicle can have limited internal space due to various constraints, such as storage space within the vehicle, size of the vehicle, need for a support structure and a floor, among other constraints. Moreover, larger camper shells and/or tents can occupy a vehicle's limited storage space. For example, a camper shell can occupy the entirety of the truck bed, thereby limiting the ability to store additional items or equipment in the truck bed. As another example, a tent mounted to the roof or the truck bed of the vehicle can block access to storage compartments or otherwise limit an effective storage capacity of the vehicle. Challenges with vehicle efficiency and maintaining vehicle storage space reduces driver's use of their vehicles and limits recreational activities among other negative impacts.

With this in mind, various aspects of the present disclosure described herein are generally directed to systems and methods for, among other things, a retractable camper shell and/or tent that can be integrated into a compartment of the vehicle such that a drag coefficient of the vehicle remains unchanged or minimally changed. The compartment of the vehicle, in one example, corresponds to an opening that is positioned in a rear of the vehicle above a chassis. In this example, the compartment may extend from the rear of a cab of the vehicle and can be enclosed on the far side (e.g., the opposite side of the cab) by a tailgate. More specifically, the compartment of the vehicle can include a truck bed. Furthermore, in an embodiment, the truck is an electric vehicle.

Returning to the example above, the retractable camper shell and/or tent can be affixed to the compartment of the vehicle. For example, a rail system of the truck bed can be used to facilitate movement of the retractable camper shell and/or tent, such as moving into a position to be expanded, providing support for expansion of components (e.g., sides), and/or providing a mechanism to expand components. In another example, the rail system of the truck bed is used to affix the retractable camper shell and/or tent to the compartment of the vehicle. In addition, in various embodiments, the retractable camper shell and/or tent includes rigid sides and a roof structure connected with soft collapsible material to enable the retractable camper shell and/or tent to be expanded, thereby creating a covered opening (e.g., within the compartment of the vehicle). To that end, the retractable camper shell and/or tent can include several vertical risers or other actuators to enable various components (e.g., roof structure) of the retractable camper shell and/or tent to be extended. In the context of expanding the retractable camper shell and/or tent to create a covered space, the retractable camper shell and/or tent can include linkage mechanisms or linear actuators to extend the roof structure upwards (e.g., along a vertical axis) and/or the rigid sides outward (e.g., along a horizontal axis).

In various embodiments, the retractable camper shell and/or tent when collapsed is flush with the compartment of the vehicle. In one example, a top of the retractable camper shell and/or tent is on a horizontal plane substantially the same as the top of the rails of the truck bed of the vehicle. In other embodiments, a side profile of the retractable camper shell and/or tent is within a body of the vehicle such that the drag coefficient of the vehicle is not altered by the retractable camper shell and/or tent. For example, the components of the retractable camper shell and/or tent (e.g., rigid side panels, fabric panels, actuators, linkage mechanism, and other component described herein) can be folded or otherwise collapsed within the compartment of the vehicle and/or under the roof structure of the retractable camper shell and/or tent.

In various embodiments, the retractable camper shell and/or tent includes "L-shaped" sides which can be slid out away from the body of the vehicle on a rail or other track system. For example, the "L-shaped" sides can slide horizontally across an edge of the truck bed. In other embodiments, the vertical risers are used to extend the roof structure up away from the body of the vehicle, allowing the "L-shaped" sides to be folded out (e.g., away from a center line of the vehicle) thereby stretching the fabric material between the "L-shaped" sides and the roof structure creating an internal space. Furthermore, in some examples, the "L-shaped" sides include a hinge to enable to a structure to fold flat while collapsed to reduce the footprint while allowing at least a portion of the "L-shaped" sides to be extended out while fully expanded to provide increased space within the retractable camper shell and/or tent. In various embodiments, the roof structure and sides (e.g., "L-shaped" sides) are connected with a soft material that can be collapsed between the roof structure and the sides, such that the retractable camper shell and/or tent maintains a low storage profile. For example, when in a collapsed position (e.g., for storage within the compartment of the vehicle) the sides can form the base and the roof structure form the top of the retractable camper shell and/or tent with the soft material between the base and the roof structure.

In other embodiments, the sides include a flat (e.g., along a horizontal axis) rigid body including a frame or attachment points for a frame that can be extended vertically from the sides to create additional space within the retractable camper shell and/or tent. In yet other embodiments, the sides are simply flat and are connected with the roof structure with a collapsible material to create a triangle shaped side of the retractable camper shell and/or tent. In various embodiments, the sides when extended form a platform along a horizontal plane which can support the driver and/or the passengers. In an example, each side forms a platform extending out (e.g., away from the body of the vehicle) from the compartment of the vehicle. Furthermore, in one example, the sides can include a mattress or otherwise function as a location for a sleeping bag. Various additional features can be included, such as a solar panel integrated into the roof structure; electrical components, such as interior lights, inflatable mattresses, heating, cooling, pop-up and/or extendable roof portion, windows, moon roof; and/or other accessories that can be integrated into the retractable camper shell and/or tent.

In this manner, the retractable camper shell and/or tent provides a space-efficient system that does not increase the drag coefficient of the vehicle or occupy a large portion of a storage compartment of the vehicle. For example, the retractable camper shell and/or tent, when collapsed covers the truck bed of the vehicle and operates as a lid and/or cover of the truck bed. In addition, the sides and/or roof structure of the retractable camper shell and/or tent, when in the expanded state, can provide a large internal space to accommodate more people and/or items. Since the retractable camper shell and/or tent generally conforms to the shape of the vehicle storage compartment (e.g., truck bed), the retractable camper shell and/or tent is less conspicuous and less likely to be stolen. Moreover, since the retractable camper shell and/or tent does not significantly alter the efficiency of the vehicle the driver and/or the passengers are not inconvenienced by increased stops and/or reduced range.

Aspects of the technical solution can be described by way of examples and with reference to FIGS. 1-10. FIG. 1 illustrates a vehicle 100 that includes a retractable camper shell and/or tent 116. In one embodiment, the vehicle 100 corresponds to an electric vehicle illustrated in FIG. 9. In an embodiment, the retractable camper shell and/or tent 116 includes a collapsed state 102A and an expanded state 102B. As illustrated in FIG. 1, in the collapsed state 102A the retractable camper shell and/or tent 116 fits within a compartment 110 of the vehicle 100. In one example, the compartment 110 of the vehicle 100 includes a truck bed including a tail gate 106. In such examples, the retractable camper shell and/or tent 116 in the collapsed state 102A, covers the truck bed while allowing the tail gate 106 to be operated (e.g., opened and closed). As described above, in the collapsed state 102A the retractable camper shell and/or tent 116 can be substantially within the compartment 110. As such, the retractable camper shell and/or tent 116 in the collapsed state 102A does not change or significantly alter the drag coefficient of the vehicle 100.

In an embodiment, the retractable camper shell and/or tent 116 includes a first side 104A, a second side 104B, and a roof structure 126 connected by a collapsible material 112 with a compartment 110. As illustrated FIG. 1, to expand the retractable camper shell and/or tent 116 into the expanded state 102B, the first side 104A can be moved in a first direction 120, the roof structure 126 can be moved in a second direction 122, and the second side 104B can be moved in a third direction 124. For example, the first side 104A is slid along a horizontal axis in the first direction 120 and the second side 104B is slid along the horizontal axis in the third direction 124 opposite the first direction 120. In this example, the roof structure 126 can be extended in the second direction 122 along a vertical axis. As described in greater detail below in connection with FIG. 7, vertical risers, linkage mechanisms, or similar actuators can be used to extend the roof structure 126 in the second direction 122 along the vertical axis. In other embodiment, the first side 104A and/or the second side 104B can be folded out along an arc. In one example, after expanding the roof structure 126 in the second direction 122 (e.g., vertically away from the compartment 110), the first side 104A and/or the second side 104B are folded out (e.g., unfolded) along an arc centered on the horizontal axis.

In various embodiments, the first side 104A, the second side 104B, and/or the roof structure 126 are constructed of a rigid material (e.g., plastic, carbon fiber, aluminum, etc.) to provide support and/or structure for the retractable camper shell and/or tent 116 while increasing an amount of internal space in the retractable camper shell and/or tent 116. Furthermore, in various embodiments, the collapsible material 112 is a fabric material (e.g., canvas, Poly Vinyl Chloride (PVC), nylon, polyester, polycotton, etc.) that is connected or otherwise coupled to one or more portions of the first side 104A, the second side 104B, and/or the roof structure 126. In one example, a first edge of the collapsible material 112 is connected or otherwise coupled (e.g., using glue, zipper, or VELCRO® strap, etc.) to a first edge of the first side 104A and a second edge of the collapsible material 112 (e.g., opposite of the first edge of the collapsible material 112) is connected or otherwise coupled to a first edge of the roof structure 126 such that a portion of the collapsible material 112 is stretched between the first side 104A and the roof structure 126 to span a distance and create the internal space.

Various different fasteners or connection mechanisms can be used to connect the collapsible material 112 to various components or portions thereof as illustrated in FIG. 1 such as the first side 104A, the second side 104B, and/or the roof structure 126. For example, buttons, magnets, or clips can be used to affix the collapsible material 112 to various edges of the first side 104A, the second side 104B, and/or the roof structure 126. In another example, a groove and/or slot can be integrated into the first side 104A, the second side 104B, and/or the roof structure 126 to receive various edges of the collapsible material 112. In general, the collapsible material 112 can be affixed to the first side 104A, the second side 104B, and/or the roof structure 126 using any suitable mechanism to allow the collapsible material 112 to be stretched between rigid and/or structural elements of the retractable camper shell and/or tent 116 as illustrated in FIG. 1. For example, the collapsible material 112 is stretched between the first side 104A and the roof structure 126 to form a sidewall of the retractable camper shell and/or tent 116.

In various embodiments, the first side 104A and/or the second side 104B are "L-shaped" structures that can be expanded (e.g., slid or folded out) to create the internal space within the compartment 110. In one example, a first section of the first side 104A and/or the second side 104B is extendable along a horizontal axis (e.g., along the first direction 120 and/or the third direction 124) and a second section of the first side 104A and/or the second side 104B is extendable along a vertical axis (e.g., along the second direction 122). In this example, the first section can be longer than the second section to create the "L" shape. As illustrated in FIG. 1, the first side 104A and/or the second side 104B in the expanded state 102B form platforms on either side of the vehicle 100. In various embodiments, these platforms are substantially symmetrical. In an embodiment, the roof structure 126 is coupled with the platform (e.g., the first side 104A and/or the second side 104B) to support the platform over the side of the vehicle 100. In one example, the platform is on the side of the vehicle (e.g., the side rails of the truck bed). In another example, the platform extends from the side of the vehicle.

Figure 5:
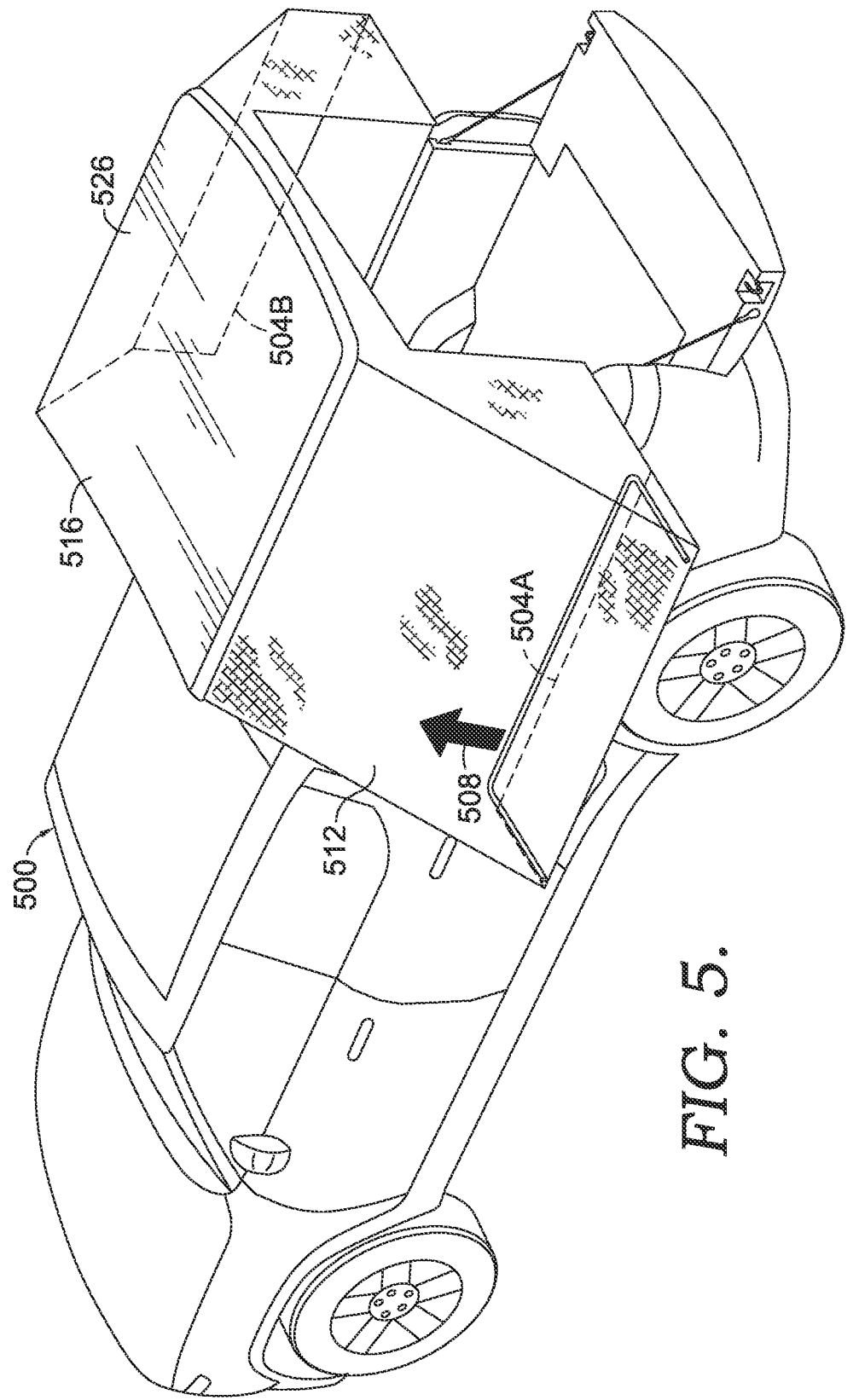
FIG. 5 is a schematic diagram of a vehicle that includes a retractable camper shell with a rigid frame structure, in accordance an embodiment of the present disclosure.

As described below in connection with FIG. 5, although "L-shaped" sides are shown in FIG. 1, other types of sides can be used in accordance with the present disclosure. Furthermore, in various embodiments, the first side 104A and the second side 104B can be asymmetrical. For example, the first side 104A can be flat and the second side 104B can be "L-shaped" as illustrated in FIG. 5.

In various embodiments, the compartment 110 can include a door and/or covering to enclose the internal space within the compartment 110. In such embodiments, the retractable camper shell and/or tent 116, in the expanded state 102B can create the internal space between the side walls (e.g., floor, side walls, rear, tail gate, etc.) of the compartment 110 and various components of the retractable camper shell and/or tent 116 such as the first side 104A, the second side 104B, the roof structure 126, and the collapsible material 112. In other embodiments, the retractable camper shell and/or tent 116 includes additional structure (e.g., floor and/or sidewalls) within the compartment 110 of the vehicle 100 to create an internal space within the retractable camper shell and/or tent 116 that rest at least partially within the compartment 110 (e.g., as illustrated below in FIG. 2B and FIG. 2D).

In one embodiment, the vehicle 100 corresponds to an electric vehicle, a hybrid vehicle, a vehicle powered by fuel, or any other object capable of transporting passengers and/or cargo. In the context of the electric vehicle, the vehicle 100 may be driven to a charging station, where the electric vehicle management client may connect the vehicle 100 to a charging station. In various embodiments, the retractable camper shell and/or tent 116 in the collapsed state 102A does not alter the drag coefficient of the vehicle 100 and thereby does not increase the need of the vehicle 100 to be driven to the charging station. For example, the retractable camper shell and/or tent 116 does not reduce the efficiency of the vehicle 100 by altering a profile of the vehicle 100 or increasing the drag of the vehicle 100.

Although the vehicle 100 is discussed in the context of being operated by the driver, it should be understood that the embodiments described herein are not limited to manually operated vehicles. Indeed, the embodiments described herein may be employed for other vehicles including compartments, such as hybrid vehicles, autonomous vehicles, semi-autonomous vehicles, and other devices capable of transporting cargo and passengers. In one example, an autonomous vehicle with a storage compartment includes the retractable camper shell and/or tent 116 which provides passengers a location to sleep and perform other activities during operation.

Figure 7:
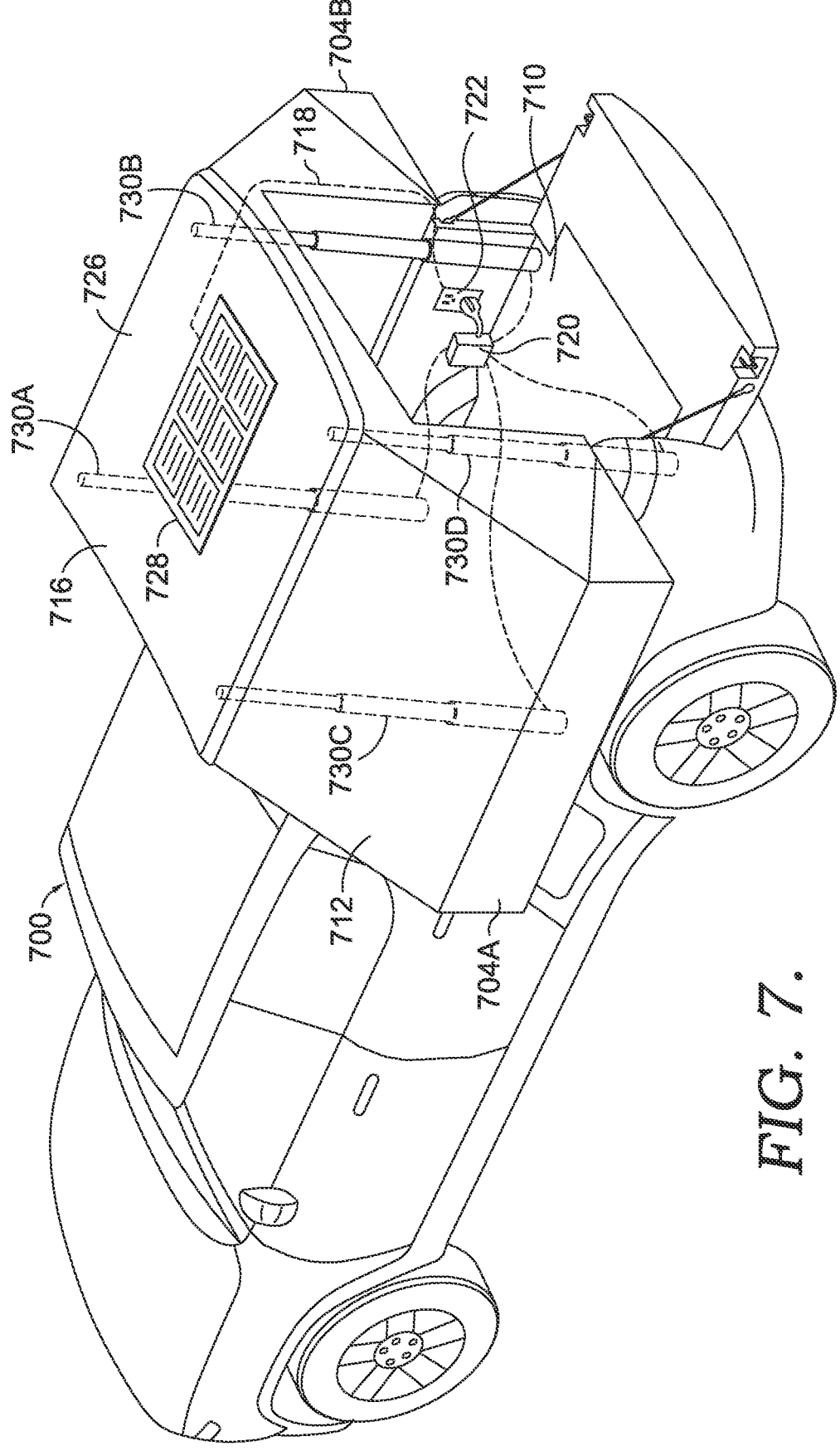
FIG. 7 is a schematic diagram of a vehicle that includes a retractable camper shell with an actuating support structure, in accordance an embodiment of the present disclosure.

In an embodiment, the vehicle 100 includes a power source, not shown in FIG. 1 for simplicity, which can provide power to the retractable camper shell and/or tent 116 and/or components thereof, such as lights, outlets, and other accessories. In one example, the power source includes a battery. In one embodiment, the power source is a low-voltage battery, such as a 12-V battery. In the context of the electric vehicle, for example, the power source is separate from a high-voltage battery that provides driving power to the vehicle 100. The electric vehicle may include a power converter to convert the high-voltage of the high voltage battery to the power source and vice versa. Furthermore, in various embodiments, the power source provides power to various accessories or devices within the retractable camper shell and/or tent 116. For example, as illustrated in FIG. 7, the retractable camper shell and/or tent 116 can include lights, a power outlet, heater, air conditioner, air pump, water pump, and/or other accessories that can draw power from the power source.

In other embodiments, the power source can be included in the retractable camper shell and/or tent 116. For example, batteries can be integrated into the roof structure 126 and/or the sides (e.g., the first side 104A and the second side 104B). Furthermore, in various embodiments, the retractable camper shell and/or tent 116 includes a solar panel to generate energy to be stored in the power source or other location (e.g., batteries integrated into the retractable camper shell and/or tent 116). Additionally, the power source may provide power to other vehicle components, such as windshield wipers, radio, and/or other on-board devices, even when the vehicle is powered off.

In various embodiments, the retractable camper shell and/or tent 116, in the collapsed state 102A, extends between a first side (e.g., driver side) of the vehicle 100 and a second side (e.g., passenger side) of the vehicle 100, for example, along a lateral length of the vehicle 100, as illustrated in FIG. 1. In addition, the retractable camper shell and/or tent 116, when in the collapsed state 102A, extends between an anterior side of the compartment 110 (e.g., the side closest to the front of the vehicle 100) to the posterior side of the compartment 110 (e.g., the side closest to the rear of the vehicle 100), as illustrated in FIG. 1. In this manner, the retractable camper shell and/or tent 116 substantially covers a plane (e.g., the top) of the compartment 110. For example, the compartment 110 is defined as having a continuous cross sectional area between a first end of a first lateral side of the vehicle 100 and a second end of a second lateral side of the vehicle 100 that extends from the cab to the rear of the vehicle 100 and is open (e.g., not enclosed by the vehicle 100) along a horizontal plane. In this example, the retractable camper shell and/or tent 116 occupies at least a portion of the compartment 110 and encloses or otherwise provides an upper surface of the compartment 110.

Figure 4:
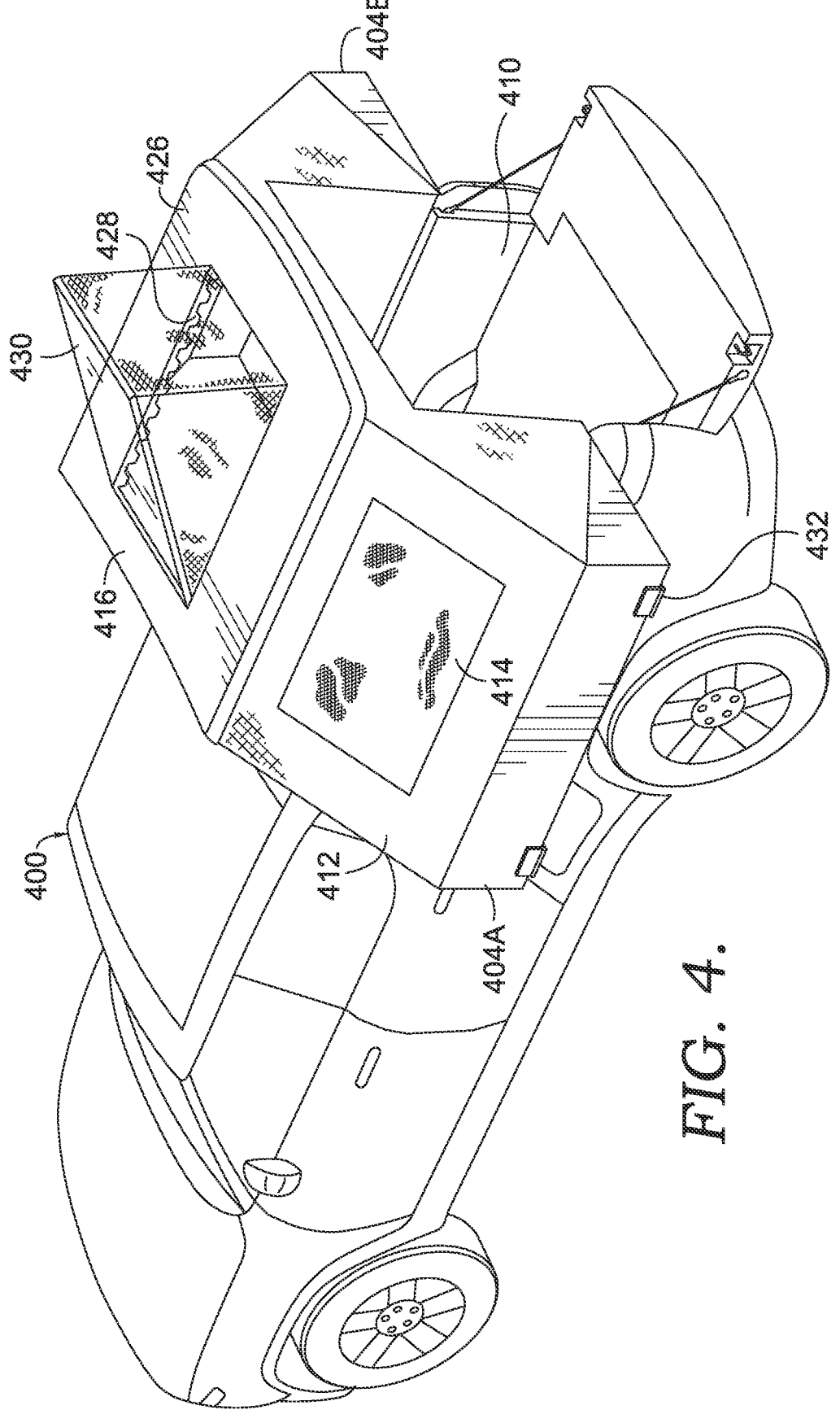
FIG. 4 is a schematic diagram of a vehicle that includes a retractable camper shell including a skylight and windows, in accordance an embodiment of the present disclosure.

In one embodiment, the roof structure 126 is supported by one or more vertical risers or any other suitable closing and opening mechanism that enables the roof structure 126 to extend vertically away from the base of the compartment in order to expand (e.g., transition from the collapsed state 102A to the expanded state 102B). Furthermore, in an embodiment, the first side 104A and the second side 104B open and close (e.g., transition from the collapsed state 102A to the expanded state 102B) by sliding out of the compartment 110 (e.g., along a rail or other portion of the compartment 110), extending along a horizontal axis, and pivoting via a hinge about a pivot point to form the "L-shaped" structure. The roof structure 126, the first side 104A, and the second side 104B, in various embodiments, open and close using a different mechanism than each other. For example, the roof structure 126 is extended along the vertical axis using risers as illustrated in FIG. 7 and the sides pivot via a hinge about a pivot point as illustrated in FIG. 4.

Figures 2A, 2B, 2C, 2D:
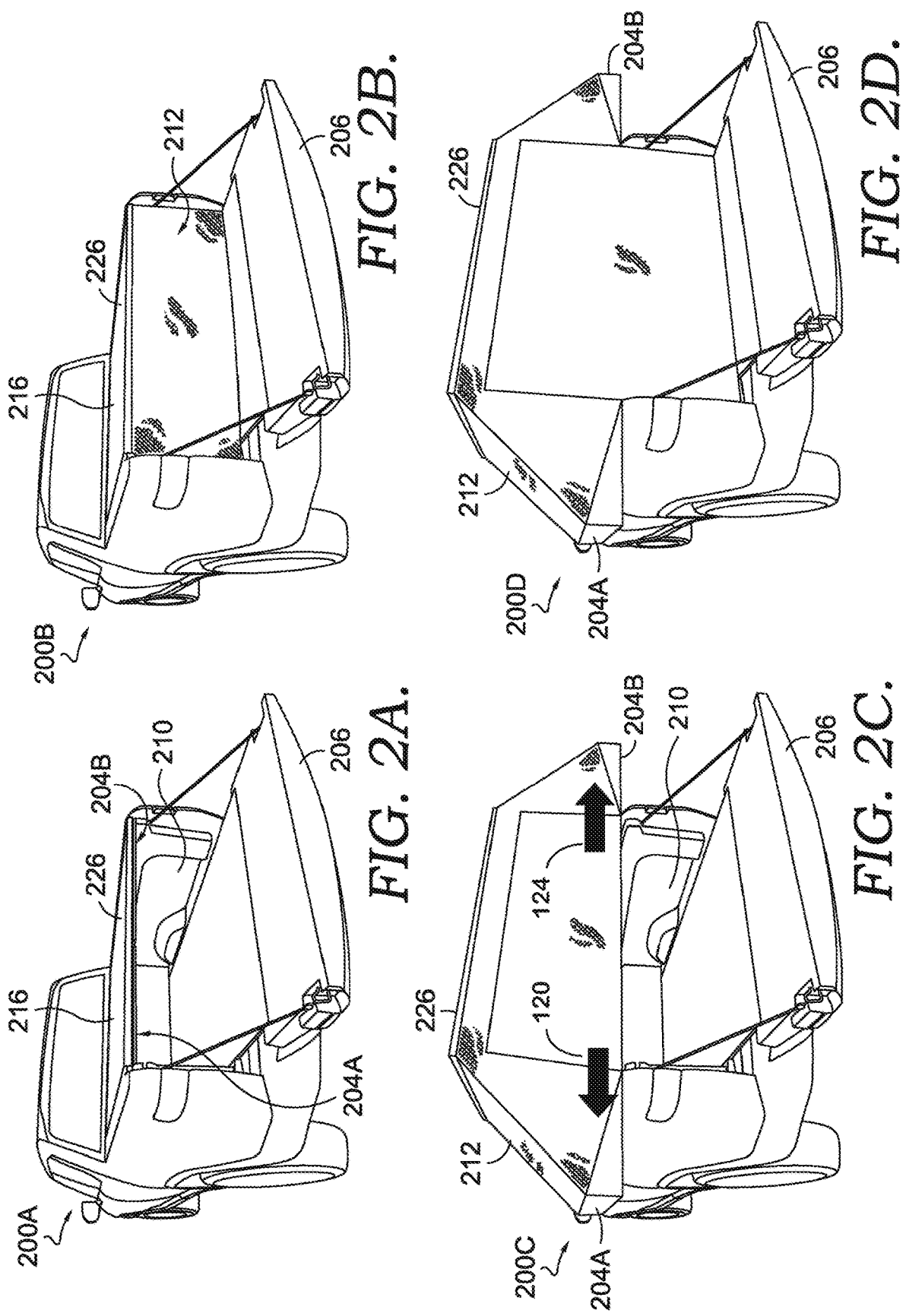
FIG. 2A is a schematic diagram of a rear view of a portion of a vehicle having a retractable camper shell in a retracted position, in accordance an embodiment of the present disclosure.
FIG. 2B is a schematic diagram of a rear view of a portion of a vehicle having a retractable camper shell in a retracted position, in accordance an embodiment of the present disclosure.
FIG. 2C is a schematic diagram of a rear view of a portion of a vehicle having a retractable camper shell in a retracted position, in accordance an embodiment of the present disclosure.
FIG. 2D is a schematic diagram of a rear view of a portion of a vehicle having a retractable camper shell in a retracted position, in accordance an embodiment of the present disclosure.

In various embodiments, the roof structure 126, the first side 104A, and the second side 104B conform to a shape defined by the compartment 110 or other components of the vehicle 100. For example, the compartment 110 may include any combination of straight sides, sharp edges, and/or curved regions. In one embodiment, the compartment 110 includes a quadrilateral-like lateral cross section, such as parallelogram-like, rectangular-like, or trapezoidal-like lateral cross section. In one embodiment, compartment 110 has substantially flat sides, such that the retractable camper shell and/or tent 116 may have substantially flat sides, as shown in FIG. 2A, FIG. 2B, FIG. 2C, FIG. and 2D. Furthermore, the retractable camper shell and/or tent 116, in an example, includes side walls and corner regions that conform to the compartment 110, such that a cross sectional shape of the retractable camper shell and/or tent 116 substantially matches a cross sectional shape of the compartment 110.

In one embodiment, the compartment 110 includes a rail system not illustrated in FIG. 1 for simplicity. The rail system, for example, includes a rail and a roller assembly that can be used to attach components of the retractable camper shell and/or tent 116 (e.g., the first side 104A and the second side 104B) and allow the components to move along the rail system to enable the retractable camper shell and/or tent 116 to extend to the expanded state 102B. For example, the roller assembly of the rail system may mate with the rail of the rail system to facilitate movement of the components along the compartment 110. In an embodiment, the rail system is integrated into the compartment 110. In yet other embodiments, the rail system is integrated into the retractable camper shell and/or tent 116.

In one embodiment, the rail system includes a collapsible rail that collapses when the retractable camper shell and/or tent 116 is slid into the compartment 110 (e.g., to the collapsed state 102A) and that extends when the retractable camper shell and/or tent 116 extends out of the compartment 110 (e.g., to the expanded state 102B). It should be understood that the retractable camper shell and/or tent 116 may include any suitable mechanism that facilitates movement of the retractable camper shell and/or tent 116 and/or components thereof relative to the compartment 110, for example, along the lateral axis. In this manner, the retractable camper shell and/or tent 116 may more easily move relative to the compartment 110, for example, between the collapsed state 102A and the expanded state 102B.

In the expanded state 102B, the retractable camper shell and/or tent 116, for example, extends out of the compartment 110 along a vertical and horizontal axis as illustrated in FIG. 1. Furthermore, in the expanded state 102B the collapsible material 112, in various embodiments, is pulled and/or stretched to span a distance between the roof structure 126 and the sides of the retractable camper shell and/or tent 116. In various embodiments, the collapsible material 112 includes a support structure (e.g., foldable rods, wires, springs, and/or other material) to control or otherwise aid during expanding or collapsing the retractable camper shell and/or tent 116. For example, a flexible rod is sown into the collapsible material 112 to provide a force to pull or otherwise retract the collapsible material 112 into a cavity between the roof structure 126 and the sides of the retractable camper shell and/or tent 116.

As described in FIG. 7, the retractable camper shell and/or tent 116 may include an actuator, that when actuated, expands or retracts the retractable camper shell and/or tent 116 between the collapsed state 102A and the expanded state 102B. In one embodiment, a control system of the vehicle 100 receives an input indicative of a request to control a position of the retractable camper shell and/or tent 116 to cause the actuator to change a position of the retractable camper shell and/or tent 116 along the vertical axis and/or the horizontal axis (e.g., between the collapsed state 102A and the expanded state 102B). In one example, the actuator lifts the roof structure 126 along the vertical axis and the sides are folded out or slid out along the horizontal axis using manual force. The actuator may include an electric actuator, a hydraulic actuator, a pneumatic actuator (e.g., that includes pistons and fluid), hybrid actuators (e.g., pneumatics-mechanism actuators, electro-pneumatic actuators, or any suitable electromechanical device capable of automatically displacing the retractable camper shell and/or tent 116 or components thereof (e.g., the roof structure 126, the first side 104A, the second side 104B, and/or the collapsible material 112). Example actuators include a linear actuator, a solenoid actuator, a rotary actuator, a diaphragm actuator, a piezoelectric actuator, magnetic levitation actuators, and the like.

FIG. 2A, FIG. 2B, FIG. 2C, and FIG. 2D illustrate a retractable camper shell and/or tent 216, in accordance with various embodiments described herein. In various embodiments described in connection with FIG. 2A, FIG. 2B, FIG. 2C, and FIG. 2D, the retractable camper shell and/or tent 216 is secured in a compartment 210 of a vehicle 200, where the retractable camper shell and/or tent 216 includes a roof structure 226, a first side 204A, a second side 204B, and a collapsible material 212.

For example, as illustrated in FIG. 2A, the retractable camper shell and/or tent 216, when collapsed, covers the compartment 210 but does not occupy the entirety of an internal storage space of the compartment 210. In this manner, the internal storage space within the compartment 210 can be used to store and/or transport items while the retractable camper shell and/or tent 216 is secured to the vehicle 200 and/or used by a driver and/or passengers of the vehicle 200. Although not illustrated in FIG. 2A, the collapsible material 212, in an embodiment, is stored or otherwise positioned between the roof structure 226, the first side 204A, and the second side 204B. For example, when the retractable camper shell and/or tent 216 is collapsed, the first side 204A and the second side 204B are slid, pivoted, or otherwise moved into the compartment 210 and the collapsible material 212 is folded or otherwise occupies a space above the first side 204A and the second side 204B and below the roof structure 226. Furthermore, as illustrated in FIG. 2A, the internal storage space of the compartment 210 is accessible when a tailgate 206 of the vehicle 200 is open.

In another example, as illustrated in FIG. 2B, the retractable camper shell and/or tent 216, when collapsed, covers the compartment 210 and occupies the internal storage space of the compartment 210. In an embodiment, the first side 204A and the second side 204B, not shown in FIG. 2B for simplicity, are positioned along the sides or a base of the compartment 210 and the collapsible material 212 occupies at least a portion of the internal storage space of the compartment 210. In such embodiments, the roof structure 226, when the retractable camper shell and/or tent 216 is in the collapsed state, covers the compartment 210. FIG. 2A and FIG. 2B illustrate alternative configurations of the retractable camper shell and/or tent 216 (e.g., occupying the compartment 210 and not occupying the compartment 210); however, other configurations such as partially occupying the compartment 210 can be used in connection with the embodiments described in the present disclosure.

Similarly, FIG. 2C and FIG. 2D illustrate alternative configurations of the retractable camper shell and/or tent 216 in an expanded state. Furthermore, different embodiments of the retractable camper shell and/or tent 216 in the expanded state as illustrated in FIG. 2C and FIG. 2D can be used with either embodiment of the retractable camper shell and/or tent 216 in the collapsed state as illustrated in FIG. 2A and FIG. 2B. For example, the retractable camper shell and/or tent 216 illustrated in FIG. 2A, when expanded, creates an internal space as illustrated in FIG. 2D. In another example, the retractable camper shell and/or tent 216 illustrated in FIG. 2B, when expanded, creates an internal space as illustrated in FIG. 2C.

Turning now to FIG. 2C, in an embodiment, the first side 204A and the second side 204B, when expanded, creates a floor and/or base of the retractable camper shell and/or tent 216 that is substantially level with a top of the compartment 210. In such embodiments, the internal storage space within the compartment 210 is maintained. As described above, when the retractable camper shell and/or tent 216 is expanded as illustrated in FIG. 2C, the collapsible material 212 can be stretched between the first side 204A, the roof structure 226, and the second side 204B to create an internal space which can be used to house the driver and/or the passengers of the vehicle 200.

Figure 8:
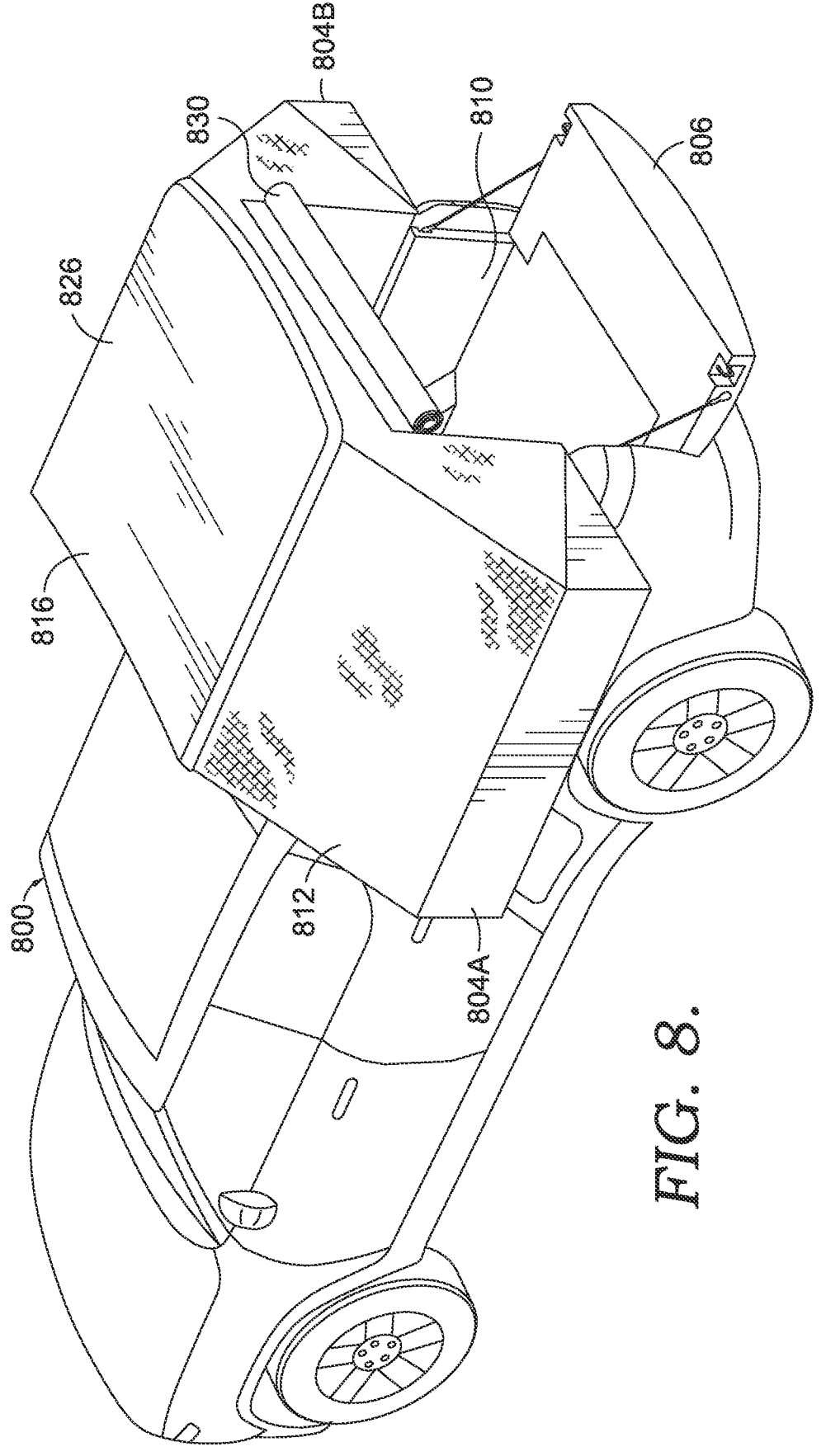
FIG. 8 is a schematic diagram of a vehicle that includes a retractable camper shell with an entrance cover, in accordance an embodiment of the present disclosure.

FIG. 2D illustrates an embodiment in which the retractable camper shell and/or tent 216 occupies the compartment 210 and thereby increasing an amount of space within the retractable camper shell and/or tent 216 created in the expanded state. For example, the collapsible material 212 extends to the base of the compartment 210. Furthermore, in an embodiment, the collapsible material 212 can be secured to the compartment 210 to create the increase in space within the retractable camper shell and/or tent 216 as illustrated in FIG. 2D. For example, hooks, snaps, clips, or other fasteners can be used to connect portions of the collapsible material 212 to the base of the compartment 210 to affix the collapsible material 212. Furthermore, as illustrated in FIG. 8, a door or other form of entryway can be included in the retractable camper shell and/or tent 216 in various embodiments.

Figure 3:
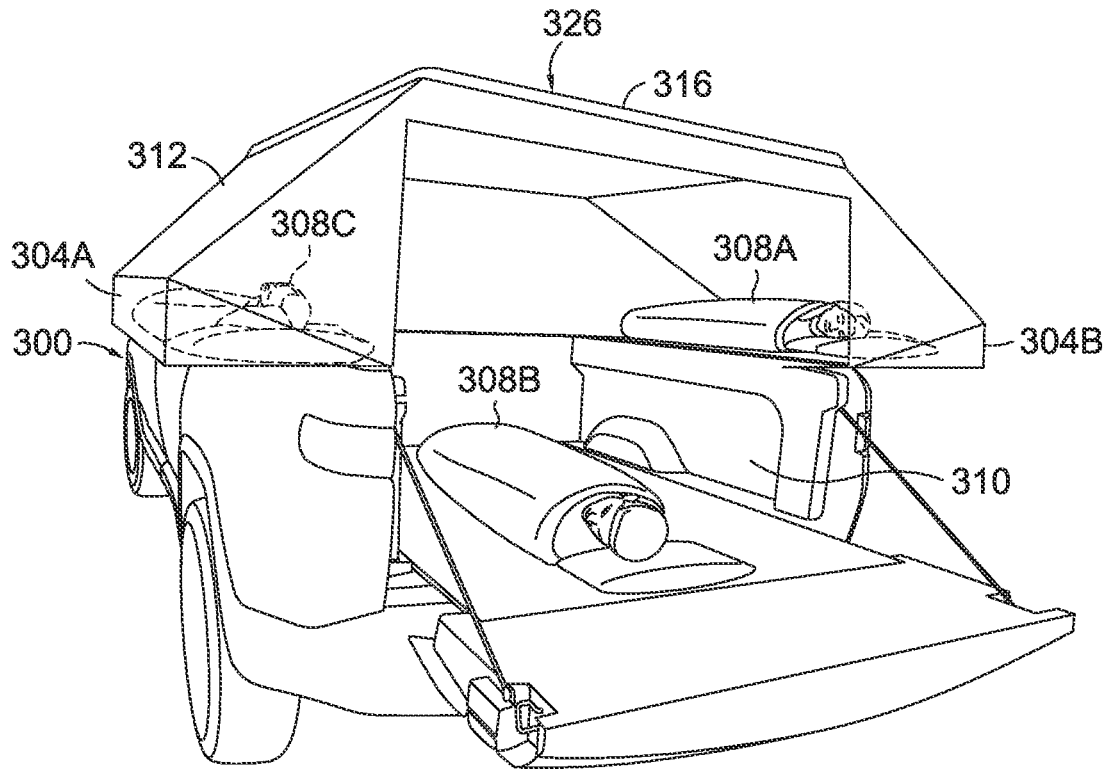
FIG. 3 is a schematic diagram of a rear view of a portion of a vehicle having a retractable camper shell in an extended position, in accordance an embodiment of the present disclosure.

FIG. 3 illustrates a vehicle 300 that includes a retractable camper shell and/or tent 316 in an expanded state. In an embodiment, the retractable camper shell and/or tent 316 is expanded to provide space for one or more people 308A-308C to sleep within a compartment 310 of the vehicle 300. Furthermore, the retractable camper shell and/or tent 316 includes a first side 304A, a second side 304B and a roof structure 326, where a distance between these components in the expanded state is spanned by a collapsible material 312 as illustrated in FIG. 3. For example, the retractable camper shell and/or tent 316, in the expanded state, creates an opening above a base of the compartment 310 that is enclosed by the first side 304A, the second side 304B, the roof structure 326, and the collapsible material 312.

In an embodiment, the first side 304A and/or the second side 304B include one or more sidewalls, which may include a continuous wall that is entirely curved in cross section, a continuous wall that includes both curved portions and straight portions in cross section, and/or a continuous wall with straight and/or curved portions in cross section with defined edges between one or more sidewalls. For example, the sidewall(s) may be composed of several pieces of panel material assembled together. In an embodiment, if the sidewall is composed of several pieces, the pieces may be connected or otherwise coupled together by welding, fasteners, glue, or using another mechanism for connecting components. The sidewalls may be made of plastic, metal alloy such as steel sheet or aluminum alloy sheet or the like, composite materials, or any other suitable material. In an embodiment, the first side 304A and/or the second side 304B may be shaped with a cross section being of a substantially rectangular shape (e.g., a square shape). In one example, the first side 304A and the second side 304B are shaped to be substantially similar to the shape of the sides of the compartment 310. Furthermore, in various embodiments, the first side 304A and the second side 304B, in the expanded state, provide platforms. For example, as illustrated in FIG. 3, the sides, in the expanded state, provide platforms suitable for sleeping or other activities.

In one embodiment, the first side 304A and/or the second side 304B include an asymmetric shape cross section (e.g., a polygon shape with no right angles between one sidewall portion and an adjacent sidewall portion and with one sidewall that is longer in cross section than the rest of the sidewalls). In addition, the first side 304A and the second side 304B, in some embodiments, are asymmetrical relative to each other. For example, as illustrated in FIG. 5, the first side 304A may be flat and the second side 304B may be "L-shaped." In an embodiment, the first side 304A and the second side 304B provide a rigid structure to allow for the persons 308C and 308A to sleep. Furthermore, in various embodiments, bedding, cushioning, sleeping bag, or other material can be affixed to an upward facing sidewall of the first side 304A and/or the second side 304B to provide a place to sleep. Other accessories can be integrated and/or affixed to the first side 304A and/or the second side 304B, such as a drain plug, heating elements, storage compartments, lighting elements, speakers, and other powered and unpowered accessories.

Turning to FIG. 4, FIG. 4 is a schematic diagram of a vehicle 400 having a retractable camper shell and/or tent 416 in an expanded state, in accordance with an embodiment. In various embodiments, the retractable camper shell and/or tent 416 includes a first side 404A, a second side 404B, and a roof structure 426 spanned by a collapsible material 412 as described above. In addition, the sides (e.g., the first side 404A and the second side 404B) include one or more hinges 432 to enable to the sides to be extended into an "L-shape" in various embodiments. Furthermore, as illustrated in FIG. 4, in various embodiments, the retractable camper shell and/or tent 416 includes a window 414 and a roof panel 430.

In various embodiments, the window 414 is constructed of a different material from the collapsible material 412 used to span a distance between the roof structure 426 and the sides (e.g., the first side 404A and the second side 404B). Furthermore, in such embodiments, the window 414 is constructed of a material with properties similar to the collapsible material 412 to enable the retractable camper shell and/or tent 416 to be collapsed. In one example, the collapsible material 412 is constructed of PVC and the window is constructed of a mesh material which provides at least some visibility (e.g., a person from within the retractable camper shell and/or tent 416 can see through the window 414). In some embodiments, the window 414 is constructed of the same material as the collapsible material 412, but is extruded, oriented, expanded, woven, or otherwise constructed such that a mesh structure is formed and that the material provides some visibility (e.g., allows at least some light to pass through the material).

In an embodiment, the window 414 includes a plastic mesh which can be extruded, oriented, expanded, woven, and/or tubular and made from polypropylene, polyethylene, nylon, PVC, and/or polytetrafluoroethylene (PTFE). In another embodiment, the window 414 includes a metal mesh which may be woven, knitted, welded, expanded, sintered, photo-chemically etched, and/or electroformed (screen filter) from steel, aluminum, or other metals. In yet other embodiments, the window 414 includes a mesh which is loosely woven or knitted from a fabric or similar material.

In an embodiment, the window 414 is constructed from a rigid and/or solid material. For example, the window 414 can be constructed of glass, tempered glass, plastic, or other material. In such embodiments, the window 414 can include a frame or other border to enable the collapsible material 412 to be affixed or otherwise connected or otherwise coupled to the window 414. In addition, in embodiment where the window 414 is constructed of a rigid material, the window 414 is constructed such that the window 414 can be folded between the sides and the roof structure 426 without significantly increasing the height of the retractable camper shell and/or tent 416.

In various embodiments, the roof panel 430 includes a sun roof, moon roof, pop-up roof, or other moveable panel. Furthermore, in an embodiment, the roof structure 426 includes a corrugated substructure 428. In one example, the roof structure 426 is constructed from cores of the corrugated substructure 428 (e.g., sandwich panels) affixed to each other. In some embodiments, honeycomb cores are used to provide additional support and/or rigidity to the roof structure 426. For example, the roof structure 426 is corrugated (e.g., constructed using corrugated cores or similar material) to provide additional support and/or rigidity that may be lost due to the inclusion of the roof panel 430.

Similar to the window 414 as described above, in various embodiments, the roof panel 430 can be made of the same or different material as the collapsible material 412. In some embodiments, the roof panel 430 is constructed of the same material as the roof structure 426. For example, the roof structure 426 and the roof panel 430 can be constructed of rigid plastic; however, the roof panel 430 may be constructed without dye, paint, or other pigment that provides opacity to the roof structure 426. As illustrated in FIG. 4, the roof panel 430 can include a rigid portion that can be extended vertically away from the roof structure 426 and a flexible portion (e.g., a mesh structure) that spans an opening between the roof structure 426 and the roof panel 430 to maintain the enclosure within the retractable camper shell and/or tent 416 when the roof panel 430 is extended.

In various embodiments, a linear actuator (e.g., such as those described in connection with FIG. 7) can be used to raise and/or lower the roof panel 430. In an example, the roof panel 430 is manually pushed vertically away from the roof structure 426, and a rod with a linkage mechanism is extended from the roof structure 426 and used to support the roof panel 430 when extended. In the context of manually moving the roof panel 430 and/or other components of the retractable camper shell and/or tent 416, a handle, groove, knob, or other mechanisms for grasping the component is included and used to facilitate movement.

As illustrated in FIG. 4, in various embodiment, the sides (e.g., the first side 404A and/or the second side 404B) includes one or more hinges 432 to support pivoting a portion of the sides around a horizontal axis. The one or more hinges 432 can, for example, include various types of hinges, such as a butt hinge, a ball bearing hinge, a spring loaded hinge, a barrel hinge, a concealed hinge, a pivot hinge, a piano hinge, a strap hinge, or other hinge suitable for supporting a portion of the side pivoting along an axis. Furthermore, in various embodiments, the one or more hinges 432 prevent over rotation of the portion of the side and provide support to maintain the "L-shape" of the sides as illustrated in FIG. 4. The one or more hinges 432, in various examples, are constructed of metal, plastic, or other suitable material and can be affixed to the sides using screws, nails, glues, or other suitable mechanism. In various embodiments, the first side 404A and the second side 404B can be asymmetrical both in design and/or construction. For example, the first side 404A can include a hinge while the second side 404B does not include a hinge.

FIG. 5 is a schematic diagram of a vehicle 500 having a retractable camper shell and/or tent 516 in at least a partially expanded state, in accordance with an embodiment. In various embodiments, the retractable camper shell and/or tent 516 includes a first side 504A, a second side 504B, and a roof structure 526 spanned by a collapsible material 512 as described above. In addition, the sides (e.g., the first side 504A and the second side 504B) include a support bar 508 to provide additional support and further expand the internal space within the retractable camper shell and/or tent 516 in various embodiments.

In an embodiment, the support bar 508 includes a rectangular shaped structure with an open side (e.g., a "U-shape") that can be pivoted along a horizontal axis to create an "L-shape" with a side of the retractable camper shell and/or tent 516. Although a rectangular shape is shown in FIG. 5, other shape such as a semi-circle, parallelogram, or other geometric shape can be used to expand the internal space of the retractable camper shell and/or tent 516. In an embodiment, the support bar 508 is affixed to the first side 504A using a pair of hinges (e.g., one at each end of the support bar 508) to allow the support bar 508 to be pivoted along the horizontal axis.

In other embodiments, the support bar 508 is folded into a groove or other recess within the first side 504A. For example, the first side 504A includes a grove of substantially a same shape as the support bar 508 and slightly larger (e.g., larger width, depth, circumference, etc. based on the shape of the support bar 508) to allow the support bar 508 to be at least partially contained within the first side 504A. As such, in various embodiments, the internal space within the retractable camper shell and/or tent 516 can be increased using the support bar 508.

In other embodiments, the retractable camper shell and/or tent 516 can maintain triangular shaped sides (e.g., without the use and/or inclusion of the support bar 508). For example, the retractable camper shell and/or tent 516 can simply include the first side 504A and the second side 504B, which can slide out to an expanded state to create triangular shaped sides of the retractable camper shell and/or tent 516. In some embodiments, the driver and/or the passenger can choose whether to extend the support bar 508. Furthermore, in various embodiments, the support bar 508 can be made of a rigid or a semi-rigid material. For example, the support bar 508 can be constructed of aluminum alloys, carbon fiber, and/or fiberglass. In addition, in an embodiment, the support bar 508 includes multiple discrete parts and/or sections. For example, the support bar 508 can include flexible tent poles including a plurality of sections connected or otherwise coupled by an elastic cord within the support bar 508. Although several embodiments are described in connection with the first side 504A, the embodiments can include the second side 504B alone or in combination.

Figure 6:
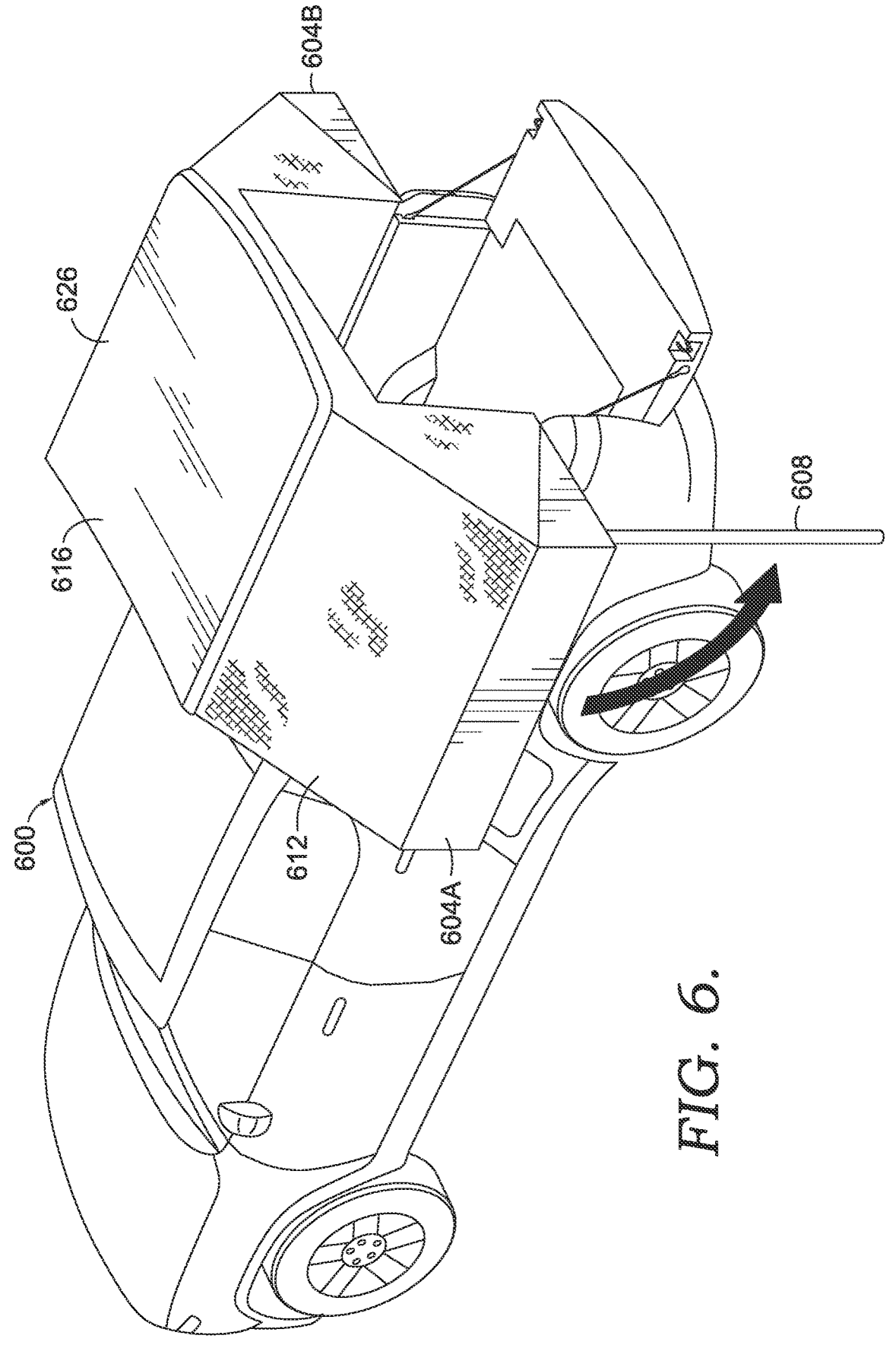
FIG. 6 is a schematic diagram of a vehicle that includes a retractable camper shell with an actuating support structure, in accordance an embodiment of the present disclosure.

FIG. 6 is a schematic diagram of a vehicle 600 having a retractable camper shell and/or tent 616 in an expanded state, in accordance with an embodiment. In various embodiments, the retractable camper shell and/or tent 616 includes a first side 604A, a second side 604B, and a roof structure 626 spanned by a collapsible material 612 as described above. In addition, the sides (e.g., the first side 604A and the second side 604B) include a leg 608 to provide additional support in various embodiments.

For example, to facilitate balancing, the retractable camper shell and/or tent 616 in the expanded state, the first side 604A includes the leg 608. In one embodiment, the leg 608 is positioned under the first side 604A. The leg 608, for example, pivots about an underside of the first side 604A and rotates about a longitudinal axis in a direction of a base of the vehicle 600. By rotating, the leg 608 may transition from being substantially parallel to the ground to being substantially perpendicular to the ground. In one embodiment, the leg 608, when folded, is positioned within a groove or cavity of the underside of the first side 604A. In other embodiments, the leg 608 includes at least one flat side such that the leg 608, when folded, is flush or substantially flush with the underside of the first side 604A. In one embodiment, the leg 608 is of an adjustable length. For example, a first portion of the leg 608 slides relative to a second portion of the leg 608 along a common axis. The leg 608, in various embodiments, includes a locking mechanism to lock the position of the leg 608 relative to the first side 604A. In this manner, the locking mechanism may lock the position of the leg 608, for example, when the leg 608 contacts the ground, thereby providing balance on different types of terrain and surfaces. Although several embodiments are described in connection with the first side 604A, the embodiments can include the second side 604B alone or in combination.

FIG. 7 is a schematic diagram of a vehicle 700 having a retractable camper shell and/or tent 716 in an expanded state, in accordance with an embodiment. In various embodiments, the retractable camper shell and/or tent 716 includes a first side 704A, a second side 704B, and a roof structure 726 spanned by a collapsible material 712 as described above. Furthermore, in various embodiments, the retractable camper shell and/or tent 716 includes a set of actuators 730A-730D and a solar panel 728 which may supply power to the vehicle 700 using a power converter 720. Illustrated as dashed lines in FIG. 7, in an embodiment, electrical cabling 718 can be included in the retractable camper shell and/or tent 716 to distribute power as described in the present disclosure. In one example, the electrical cabling 718 is integrated into components of the retractable camper shell and/or tent 716 such as the first side 704A, the second side 704B, the roof structure 726, the collapsible material 712, the set of actuators 730A-730D, or other components.

In an embodiment, the retractable camper shell and/or tent 716 includes a cord that is electrically coupled to outlets 722 on the vehicle 700 or outlets positioned within a compartment 710 of the vehicle 700. The outlets 722, for example, are electrically connected to a power source, such as a battery (e.g., 12-V battery) of the vehicle 700 and the retractable camper shell and/or tent 716. The outlets 722 can transfer power from the power source to the retractable camper shell and/or tent 716, for example, to cause the set of actuators 730A-730D to expand and/or retract. In an embodiment, a control system (e.g., such as the control system described in connection with FIG. 9) can send control signals to the power source to control the set of actuators 730A-730D. In this manner, the driver and/or passenger of the vehicle 700 can control a state (e.g., expanded or collapsed) of the retractable camper shell and/or tent 716. In an embodiment, the control system prevents operation of the set of actuators 730A-730D while the vehicle 700 is in motion, not in a parked state, or is otherwise in a state where expansion of the retractable camper shell and/or tent 716 may be unsafe.

In one embodiment, the retractable camper shell and/or tent 716 includes a lever or switch that may be engaged to activate the set of set of actuators 730A-730D. An example lever includes a toggle switch, a rotary switch, a mercury switch, a push-button switch, a reversing switch, and the like. Furthermore, the set of actuators 730A-730D may include linear actuators, rotary actuators, electrical actuators, or other actuators suitable for moving the roof structure 726 along a vertical axis. Additionally, the set of actuators 730A-730D may include one or more actuators to move the first side 704A and/or the second side 704B. In one example, the set of actuators 730A-730D are responsible for moving the retractable camper shell and/or tent 716 between a collapsed state and the expanded state.

In one embodiment, the retractable camper shell and/or tent 716 includes a retractable cord (e.g., 12-V cord) that may plug-in or mate with the outlets 722 associated with the power source (e.g., a power outlet positioned on the wall of a truck bed). In this manner, the solar panel 728 integrated into the roof structure 726 of retractable camper shell and/or tent 716 can provide power to the power source. For example, the solar panel 728 can provide power to the batteries of an electric vehicle. In one embodiment, the solar panel 728 supplies power to a first battery (e.g., a 120-V battery), and/or supplies power to a second battery (e.g., a 12-V battery). For example, the solar panel 728 can provide power to the vehicle 700 and a power supply associated with the retractable camper shell and/or tent 716. In one embodiment, the retractable camper shell and/or tent 716 includes a retractable chord that may plug into the outlets 722. For example, the cord of the retractable camper shell and/or tent 716 may interface and connect to the electric output (e.g., 12-V port) to receive electric power.

FIG. 8 is a schematic diagram of a vehicle 800 having a retractable camper shell and/or tent 816 in an expanded state, in accordance with an embodiment. In various embodiments, the retractable camper shell and/or tent 816 includes a first side 804A, a second side 804B, and a roof structure 826 spanned by a collapsible material 812 as described above. Furthermore, in various embodiments, the retractable camper shell and/or tent 816 includes an entryway 830.

In various embodiments, the entryway 830 includes fabric material or other material that can be opened, removed, or otherwise moved to allow access to the internal space within a compartment 810 of the vehicle 800. For example, as illustrated in FIG. 8, the entryway 830 can be rolled up and attached to the roof structure 826 or a portion of the collapsible material 812 (e.g., near the roof structure 826 and/or top of the retractable camper shell and/or tent 816). In other embodiments, the entryway 830 includes a zipper to allow the entryway 830 to be opened. For example, the entryway 830 is constructed from a same material as the collapsible material 812 and attached to the retractable camper shell and/or tent 816 using a zipper around at least a portion of the entryway 830.

In various embodiments, the entryway 830 extends to a base of the compartment 810. For example, the collapsible material 812 and/or the retractable camper shell and/or tent 816 is constructed to utilize the entire compartment 810 and the entryway 830 extends vertically from a base of the collapsible material 812 and/or the retractable camper shell and/or tent 816. In other embodiments, the entryway 830 is constructed to extend to a top of a tailgate 806. For example, the entryway 830 and the tailgate 806 are both closed in order to close or otherwise seal the retractable camper shell and/or tent 816. In various embodiments, the entryway 830 includes two distinct layers and/or materials. For example, an exterior of the entryway 830 is constructed from a first material (e.g., PVC) and a second material (e.g., mesh) on an interior of the retractable camper shell and/or tent 816.

Example Electric Vehicle System

Figure 9:
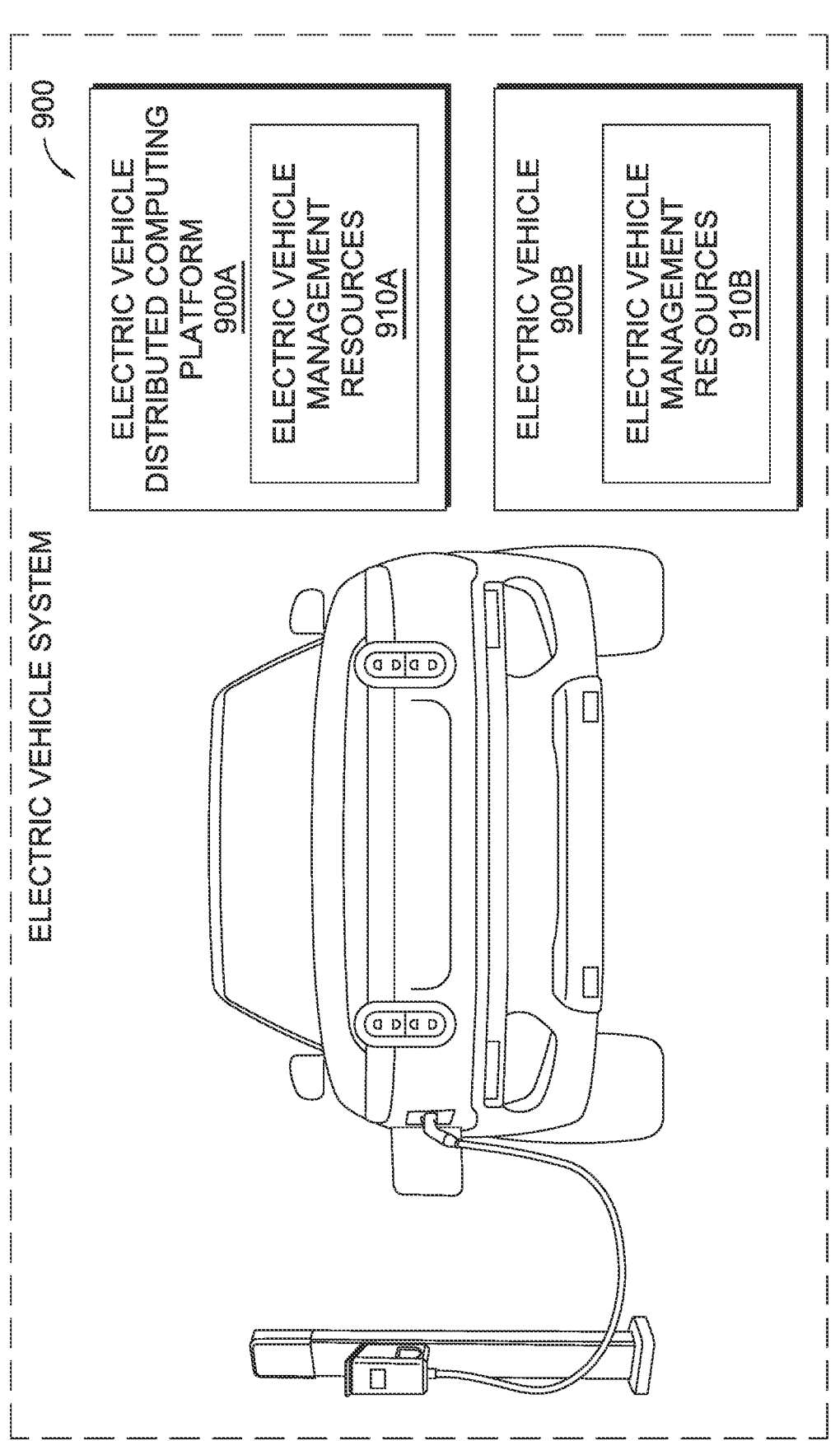
FIG. 9 is a schematic diagram of an example electric vehicle system, in accordance an embodiment of the present disclosure.

With reference to FIG. 9, FIG. 9 illustrates an example electric vehicle system 900 in which implementations of the present disclosure may be employed. In particular, FIG. 9 shows a high level architecture of an example electric vehicle distributed computing platform 900A and electric vehicle 900B having electric vehicle management resources 910A and electric vehicle management resources 910B, respectively, that support the functionality described herein. The electric vehicle system 900 can host a technical solution environment, or a portion thereof.

The electric vehicle distributed computing platform 900A includes electric vehicle management resources 910A that provide and support electric vehicle distributed computing systems and operations. Electric vehicle distributed computing platform 900A can run cloud services across different data centers and geographic regions. Typically the electric vehicle distributed computing platform 900A acts to store data or run service applications in a distributed manner. For example, a service application can be supported a computing environment (e.g., host, node, and virtual machine) and resources (e.g., hardware resources and software resources) that are configured the service application; and a client device may be linked to a service application and configured to issue commands to the service application. Communications in the electric vehicle distributed computing platform 900A are performed through a virtual Internet Protocol (IP) and over a network (not shown), which may include, without limitation, one or more local area networks (LANs) and/or wide area networks (WANs).

The electric vehicle 900B includes electric vehicle management resources 910B that provide and support electric vehicle systems and operations. Electric vehicle 900B can refer to a vehicle that uses electric power. The electric vehicle 900B can be built on a configuration for an automotive chassis used for automotive platforms of battery electric vehicles. The configuration can include a base structure that houses the batteries, electric motors, and other electronic components of the electric vehicle. By way of example, the electric vehicle can include a steering system, brake sensor system, and controller systems.

Controllers can include one or more systems on chips (SoCs) that may provide signals to one or more components and systems of the vehicle. For example, controllers can support a steering system, braking system, one or more onboard computing devices, artificial intelligence functionality (e.g., computer vision), infotainment functionality, global navigation satellite systems and sensors (e.g., Global Positioning System sensors, RADAR sensors, LIDAR sensors) and inertial measurement unit (IMU) sensors (e.g., accelerometers, gyroscopes). Controllers may receive inputs (e.g., represented by input data) from and provide outputs (e.g., represented by output data, display data, etc.) via a human-machine interface (HMI) display @134 and other components of the electric vehicle.

The electric vehicle further includes a network interface which may use one or more wireless antenna(s) and/or modem(s) to communicate over one or more networks. For example, the network interface may be capable of communication over LTE, WCDMA, UMTS, GSM, CDMA2000, etc. The wireless antenna(s) @126 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown. The various blocks are shown with lines for the sake of conceptual clarity, and other arrangements of the described components and/or component functionality are also contemplated. FIG. 9 is merely meant to illustrative of an example electric vehicle and electric vehicle system that can be used in connection with one or more embodiments of the present invention.

Example Computing Environment

Figure 10:
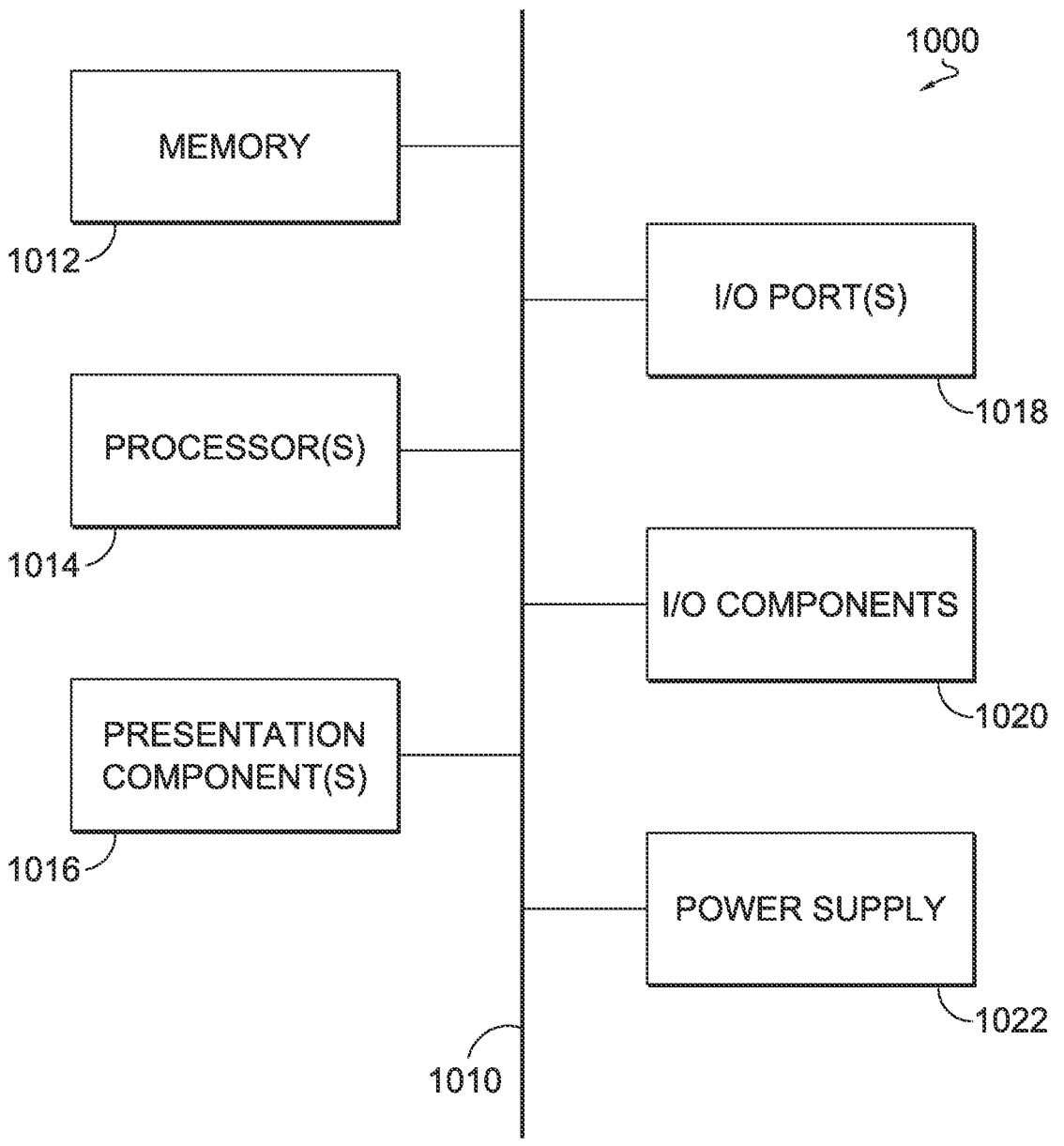
FIG. 10 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 10 in particular, an example operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. An apparatus, comprising:
  a platform configured to be slidable into a position in which the platform is supported by a side of a truck bed of a vehicle, the platform comprising a first portion and a second portion attached together by at least one corner hinge to allow the second portion of the platform to be extended along a vertical axis to form an L-shaped structure; and one or more actuators configured to support a roof structure, wherein the roof structure is coupled with the platform to support the platform over the side of the truck bed of the vehicle, and wherein the at least one corner hinge is attached to an outer surface of the first portion of the platform and an outer surface of the second portion of the platform.

2. The apparatus of claim 1, wherein:

the side of the truck bed comprises a first side of the truck bed;

the apparatus further comprises an additional platform configured to be supported by a second side of the truck bed;

the first side of the truck bed is on an opposite side from the second side of the truck bed; and the roof structure is further coupled with the additional platform to support the additional platform over the second side of the truck bed.

3. The apparatus of claim 2, wherein the platform and the additional platform are connected to the roof structure by a fabric material.

4. The apparatus of claim 2, wherein the platform and the additional platform are symmetrical.

5. The apparatus of claim 3, wherein the roof structure is extendable vertically from the platform to form an open body under the roof structure that is formed by the fabric material.

6. The apparatus of claim 1, wherein at least one of the one or more actuators is connected to a power source of the vehicle and provides power to the at least one of the one or more actuators.

7. The apparatus of claim 1, wherein the platform extends from the side of the truck bed.

8. The apparatus of claim 1, wherein the roof structure includes a solar panel connected to a power source, wherein the solar panel provides power to the power source.

9. The apparatus of claim 1, wherein at least one of the one or more actuators includes a linear actuator that extends the roof structure vertically away from the platform.

10. The apparatus of claim 1, further comprising collapsible material coupling the roof structure to the platform.

11. The apparatus of claim 1, wherein the roof structure is collapsible such that the apparatus is substantially flush with the side of the truck bed and does not change a drag coefficient of the vehicle.

12. The apparatus of claim 1, wherein the platform includes a leg that is rotatable and extendable, wherein the leg is adjustable to support the platform.

13. A vehicle, comprising:

an apparatus, comprising:

a platform configured to be slidable into a position in which the platform is supported by a side of a truck bed of a vehicle, the platform comprising a first portion and a second portion attached together by at least one corner hinge to allow the second portion of the platform to be extended along a vertical axis to form an L-shaped structure; and one or more vertical risers configured to support a roof structure, wherein the roof structure is coupled with the platform using a collapsible material that, when stretched, forms at least a portion of a sidewall of the apparatus, and wherein the at least one corner hinge is attached to an outer surface of the first portion of the platform and an outer surface of the second portion of the platform.

14. The vehicle including the apparatus of claim 13, wherein the vehicle is an electric truck.

15. The vehicle including the apparatus of claim 13, wherein the apparatus further comprises an additional platform coupled with the roof structure using a collapsible material that, when stretched, forms at least a second portion of the sidewall of the apparatus.

16. The vehicle including the apparatus of claim 15, wherein the platform and the additional platform are symmetrical.

17. A method, comprising:

causing a power source of a vehicle having a truck bed to provide power to one or more risers configured to support a roof structure of an apparatus, wherein the roof structure is coupled with a platform to support the platform over a side of the truck bed;

causing one or more risers to extend the roof structure along a vertical axis; and sliding the platform into a position in which the platform is supported by the side of the truck bed, the platform comprising a first portion and a second portion attached together by at least one corner hinge to allow the second portion of the platform to form an L-shaped structure, wherein the at least one corner hinge is attached to an outer surface of the first portion of the platform and an outer surface of the second portion of the platform.

18. The method of claim 17, further comprising:

receiving a user input indicative of a state of the apparatus, wherein the user input is received via an interface of the vehicle; and wherein causing the one or more risers to extend is based on the user input.

* * * * *